Sept. 8, 1942.  W. BIERMAN  2,295,447
MEASUREMENT DEVICE
Filed Oct. 26, 1939  2 Sheets-Sheet 1
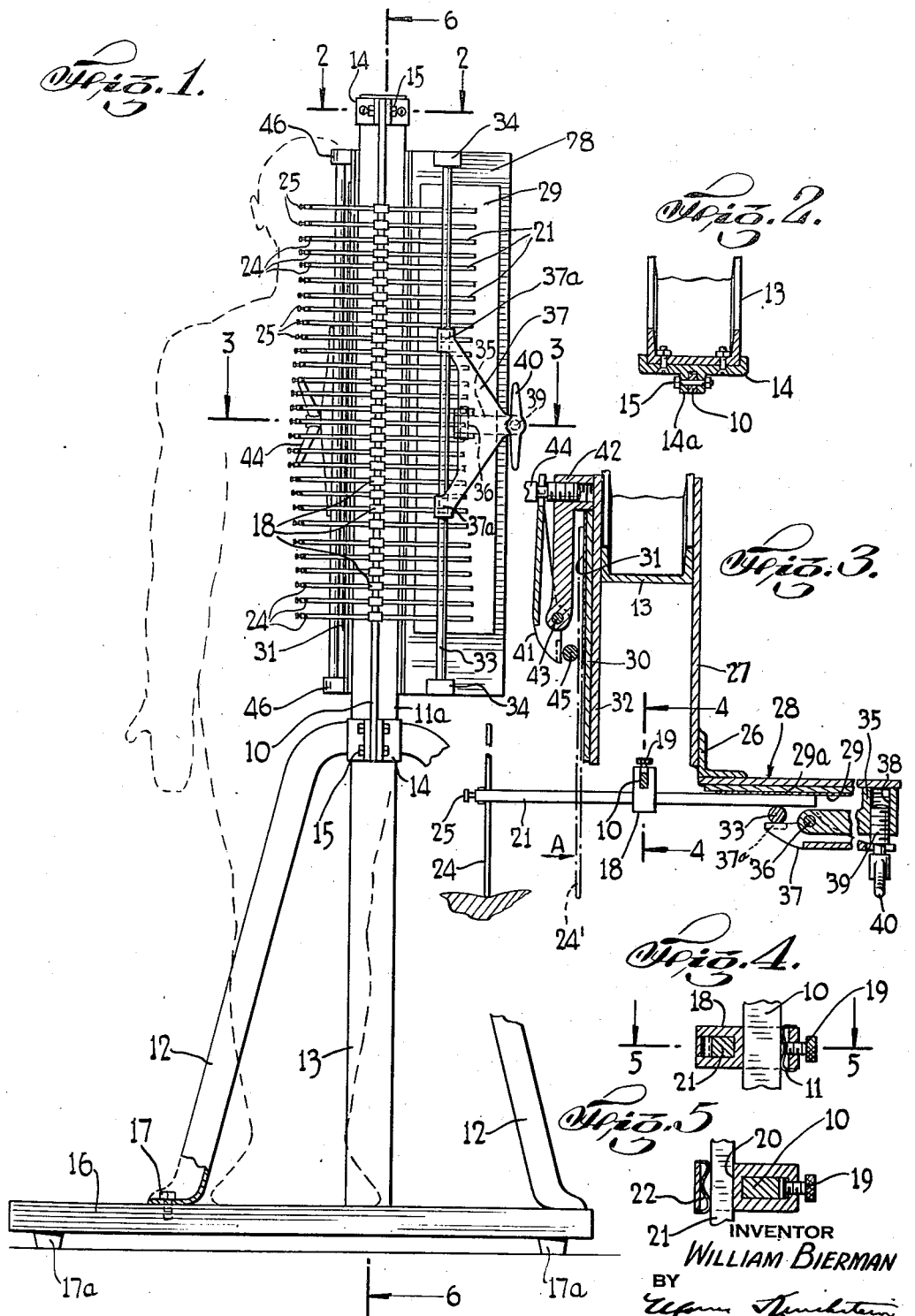

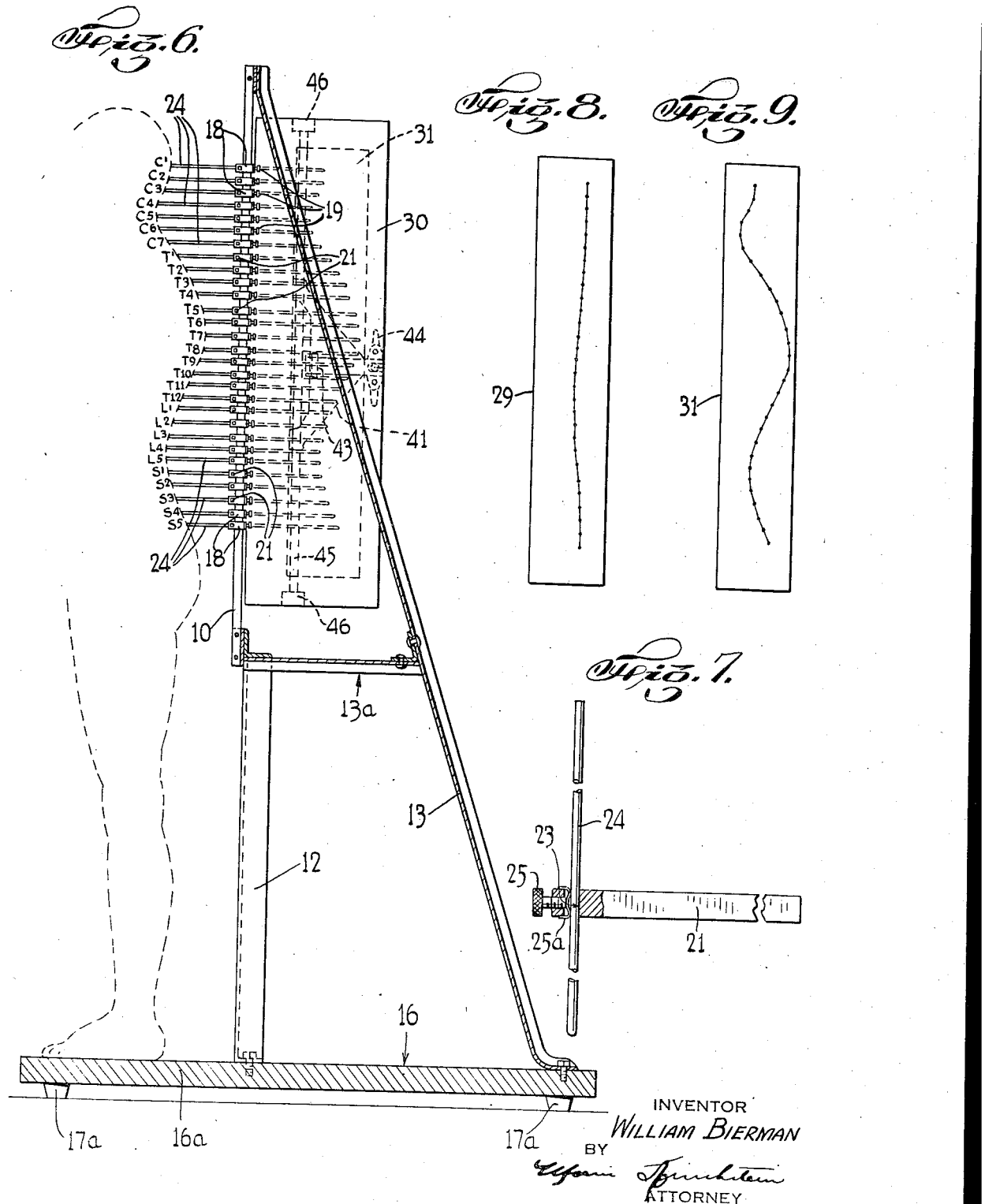

Patented Sept. 8, 1942

2,295,447

UNITED STATES PATENT OFFICE 2,295,447

MEASUREMENT DEVICE

William Bierman, New York, N. Y.

Application October 26, 1939, Serial No. 301,397

1 Claim. (Cl. 33—175)

This invention relates to measurement devices. More particularly, my invention relates to an improved apparatus designed to measure and record posture or other similar contours.

One of the objects of my invention is to provide an improved postural measurement device of the character described, which shall be so designed that a record may be made of the entire curvature of a person's spine, or of other body portions, either antero-posteriorly or laterally, in a single operation.

Another object of my invention is to provide an improved postural measurement device of the character described, which shall have means for accurately and speedily measuring contours of the human body or the like, together with a quick method of recording such contours.

Still another object of my invention is to provide an improved postural measurement device of the character described, which shall comprise relatively few and simple parts, which shall be easy to assemble, which shall have special constructional features designed to render the apparatus economical to manufacture and simple to operate, and which at the same time shall be highly efficient for the purposes intended.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claim.

In the accompanying drawings, in which is shown one of the various possible embodiments of this invention:

Fig. 1 is an elevational view of a posture measuring apparatus constructed in accordance with my invention;

Fig. 2 is an enlarged cross-sectional view taken substantially on the line 2—2 of Fig. 1;

Fig. 3 is an enlarged cross-sectional view taken substantially on the line 3—3 of Fig. 1;

Fig. 4 is an enlarged cross-sectional view taken substantially on the line 4—4 of Fig. 3;

Fig. 5 is a cross-sectional view taken substantially on the line 5—5 of Fig. 4;

Fig. 6 is a cross-sectional view taken substantially on the line 6—6 of Fig. 1;

Fig. 7 is an enlarged detail view, partly in section, of a portion of the apparatus shown in Fig. 3; and Figs. 8 and 9 are views illustrating two types of recorded measurements.

In the type of devices heretofore manufactured for recording human postural or similar contour measurements, one inherent disadvantage was found to exist, due to the fact that the measurements could only be made in one plane at a time. Since even the normal curvature of the human spine must be measured in more than one plane, such devices were apt to be inaccurate. Furthermore, since only a single measurement could be made at one time, the recording operation was necessarily cumbersome and slow. In accordance with my invention, therefore, I have provided an apparatus for recording human postural or similar measurements whereby simultaneous measurements may be taken in a number of different planes. My improved apparatus is so designed that in the act of operating the same for the purpose of measuring the antero-posterior (front to back) curvature of the spine, there will at the same time be automatically measured and ready for recording the lateral curvature of the spine, or vice versa.

The device constructed in accordance with my invention comprises a vertically disposed supporting bar 10 held in position by a frame comprising a pair of leg members 12 extending upwardly to a point adjacent the lower end of the bar 10 and symmetrically disposed on opposite sides of a rear member 13 angularly disposed with respect to the bar 10 and the members 12 and extending upwardly to a point adjacent the upper edge of the supporting bar 10. The frame is reinforced by a cross-member 13a which joins the leg members 12 and 13 at a point adjacent the lower end of the bar 10. The said bar 10 is permanently held in position by means of a pair of upper and lower guide members 14 (see Figs. 1 and 2) permanently attached to the frame members 13 and 12 respectively, and having a bifurcated portion 14a receiving the bar 10 therein. Bolt members 15 passing through the loops of the bifurcated member 14a and the bar 10 serve to hold the said bar rigidly in upright position. The lower ends of the frame members 12 and 13 are rigidly secured to a platform 16 by any suitable securing means, such as the bolts 17. It is noted from Fig. 6 of the drawings that a portion of the platform 16a projects forwardly of the frame members 12 a sufficient distance to accommodate the subject to be measured. The platform 16 may be spaced from the floor by the lugs 17a, or, if desired, the usual type of castors may be provided so that the apparatus may be readily moved from place to place.

Slidably mounted on the bar 10 are a plurality of collar members 18. The said collars 18 are adapted to be slidably moved in a direction parallel to the longitudinal axis of the bar 10 and a set screw 19 (Figs. 3, 4 and 5) actuating a leaf spring 11 resiliently engaging the bar 10 is provided on each collar 18 to maintain the said collar in selected position along the bar 10. Each of the collars 18 is further provided with a through aperture 20, the axis of which is disposed in a direction at right angles to the axis of the bar 10. In each of the apertures 20 there is slidably received a rod 21. The said rods 21 are all of the same length and made of any suitable rigid material, for reasons which will become apparent as the description proceeds. The apertures 20 are preferably made slightly larger than the size of the rods 21 in one dimension, to provide space for a resilient member, such as a leaf spring 22, clearly shown in Fig. 5 of the drawings, the said spring being interposed between the rod 21 and one wall of the opening 20 to resiliently urge the rod 21 into frictional engagement with one side of the aperture 20. It is thus seen from the above construction that when the rods 21 are slidably moved in a horizontal direction with respect to Fig. 1, the springs 22 will tend to maintain the said rods 21 in any position after such movement. To prevent axial rotational movement of the rods, 21, they are preferably made of non-circular cross-sectional contour and the apertures 20 are correspondingly shaped. Each of the rods 21 adjacent one of its ends is provided with a through aperture 23 disposed transversely of the longitudinal axis thereof. Slidably passing through the apertures 23 is a pin 24, as clearly shown in Fig. 7 of the drawings. A set screw 25 actuating a spring 25a disposed in the aperture 23 and resiliently engaging the pin 24 is mounted in the end of each of the rods 21, to maintain the said pin 24 in any desired position after movement. The pins 24 are of equal length and made of relatively rigid material, so that they will not sag of their own weight, nor bend out of alignment. It is thus seen from the above described construction that I have devised an apparatus in which the horizontal rods 21 may be moved along their horizontal axes to carry with them the pins 24 disposed at right angles to the axes of the rods 21 and in which the said pins 24 may also be slidably moved along their longitudinal axes relative to the rods 21.

Attached to the rear frame member 13 is an angle member 26 which may be rigidly attached to the said member 13 by welding one leg of the same to an intermediate plate 27, which, in turn, is welded to the said member 13. Rigidly attached to the other leg of the angle 26 is a flat rigid member 28, which is designed to have attached thereto a soft wooden board 29a, on which may be mounted any suitable recording sheet 29. It is noted that the member 28 and the sheet 29 are disposed in a plane parallel to the plane of the horizontal rods 21 and closely adjacent thereto, as shown in Fig. 3. In a similar manner to the mounting of the board 29a, there is attached to the opposite side of the member 13 from that of the board 29a a second board member 30, adapted to carry a second recording sheet 31. It is noted that the board 30 and the sheet 31 are disposed in a plane at right angles to the plane of the board member 29a and sheet 29, and also in a plane parallel to the plane of the direction of movement of the pins 24. The board member 30 may be attached to the member 13 by means of the intermediate plate 32, which is welded to the said member 13. The method of use of my apparatus will now be described, in connection with measuring and recording of the spinal contour in two planes.

The spinal outline, the curvature of which it is desired to measure, is first marked out on the subject's spine with a flesh pencil or similar marking device. The subject is then placed on the platform portion 16a of the platform 16, with his back to the apparatus, as shown in Figs. 1 and 6. To properly position the subject with respect to the apparatus, a permanent mark may be provided on the platform to indicate the position the subject should take. The collar 18 corresponding to vertebrae S5 is then slidably moved on the bar 10, until it is in such position that one end of the pin 24, carried by the rod 21 and supported by the said collar, touches the eminence of the spine corresponding to S5. Another collar 18, corresponding to vertebrae C7, carrying a rod 21 and a pin 24, is then manipulated until the end of the pin 24 touches an eminence corresponding to the said vertebra C7. There will now have been located the two extreme relatively fixed anatomical landmarks of the spine. The intermediate vertebral eminences remain relatively immobile. After the above, the remaining collars 18 corresponding to their respective vertebral eminences, as indicated in Fig. 6, are adjustably moved until the ends of the pins 24 touch the said corresponding vertebral eminences. It is thus seen from the above that the pins 24 have now been disposed, as shown in Fig. 6 of the drawings, with adjacent ends in contactive engagement with selected points on the spine of the subject. Since, as previously explained, the pins 24 are of equal size, the ends of said pins opposite to the ends which are in contactive engagement with the subject, will define the antero-posterior curvature of the spine. At the same time, it is noted from Fig. 1 that the ends of the horizontal rods 21 will have automatically indicated the lateral curvature of the spine, due to the above described mounting of the pins 24 on the rods 21 for movement therewith.

After the lateral curvature of the spine has been measured as above described, it may be plotted or reproduced on the record sheet 29, by tracing the ends of the horizontal rods 21 disposed adjacent the said sheet 29, with a pencil or any other suitable marking means. If desired, the said horizontal rod ends 21 may be pressed against the record sheet 29 to leave a mark thereon by means of the following device: A vertical rod 33 is movably supported at opposite ends thereof in a pair of suitable brackets 34. The said rod 33 is designed to overlie all of the horizontal rods 21 and is disposed in parallel relationship with the bar 10. Mounted on the plate 28 (see Fig. 3) is a bracket member 35 on which there is pivotally mounted, by means of the pivot 36, a clamping member 37 having a pair of spreading arms 37a (see Figs. 1 and 3) designed to contactively engage the rod 33. When the said clamping member 37 is pivotally moved in a clockwise direction, the arms 37a will force the rod 33 against the horizontal rods 21, which, in turn, will press the ends of said horizontal rods 21 into contactive engagement with the record sheet 29, to thus leave an impression on said record sheet of the ends of said rods 21. If desired, pin projections may be provided adjacent the ends of the rods 21 to cause perforations in the record sheet 29. To facilitate rotational movement of the clamping member 37 about the pivot 36, a portion of the bracket 35 is provided with a threaded aperture 38, into which there is received a screw threaded shank 39 having a portion thereof extending through an opening in the clamping member 37, the said projecting portion being provided with a handle member 40, so arranged as to cause pivotal movement of said member 37. It is thus seen that when the handle member 40 is rotated in a direction to cause the threaded shank 39 to move outwardly, the clamping member 37, being movably attached to the shank 39, will rotate in a clockwise direction to cause the said longitudinal rod ends to impress themselves on the record sheet 29.

To record the antero-posterior curvature of the spine, it is merely necessary to slidably move the rods 21 in the direction of the arrow A in Fig. 3, until the pins 24 are disposed in the dotted line position 24' adjacent to and with the ends of the rods 21 overlying the record sheet 31. The antero-posterior curvature of the spine corresponding to the positioning of the pins 24, as shown in Fig. 6, may then be plotted on the record sheet 31, in a manner similar to that described in connection with the plotting of the lateral curvature on the record sheet 29. Means are provided for pressing the ends of the pins 24 against the record sheet 31, similar to the means described in connection with the making of the record on the sheet 29. Such means may comprise a clamping member 41 pivotally mounted on a bracket 42 by means of the pivot 43 and provided with a handle member 44 designed to cause counter-clockwise rotational movement of the clamping member 41 to press against a rod 45, similar in design and function to the rod 33, and movably mounted in a pair of brackets 46, the said rod 45 being parallel to the bar 10 and overlying the pins 24.

In Fig. 8, there is shown the record sheet 29 having impressed thereon the plotted curve representing the lateral curvature of the spine measured by the rods 21, and in Fig. 9 there is shown the record sheet 31 having impressed thereon the plotted curve representing the antero-posterior curvature of the spine, measured by the pins 24.

It is thus seen from the above description that I have provided an apparatus for measuring and recording the curvature of the spine in two planes, and which is so designed that the setting of the apparatus for the measurement of the curvature in one plane will automatically measure the curvature of the spine in a plane at right angles to the first plane, at the same time.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

A device of the class described which is adapted to record the lateral curvature of the spine or other body parts on a record sheet, said device comprising a plurality of rod members of equal length, means for supporting said rod members in parallel relationship, said last named means including means whereby said rod members may be selecttively spaced from each other, said rod members being additionally axially movable, a pin member carried by each of said rod members for movement therewith, said pin members being disposed in parallel relationship and movable relatively to said rod members in a direction at right angles to the directions of movement of said rod members, the relative positioning of said pin members being a measure of the antero-posterior curvature of the spine or other body parts, the relative positioning of said rod members being a measure of the lateral curvature of the said spine or other body parts, means for recording said lateral curvature, a recording means comprising means to support said record sheet underneath adjacent ends of said rod members, and means for pressing said last named rod member ends against said sheet.

WILLIAM BIERMAN.